United States Patent [19]

Lorentzen

[11] Patent Number: 5,521,355
[45] Date of Patent: May 28, 1996

[54] WELDING TORCH ASSEMBLY AND METHOD

[75] Inventor: Joel E. Lorentzen, Davenport, Iowa

[73] Assignee: Genesis Systems Group, Ltd., Davenport, Iowa

[21] Appl. No.: 401,274

[22] Filed: Mar. 9, 1995

[51] Int. Cl.⁶ .................................................. B23K 9/133
[52] U.S. Cl. .................... 219/137.7; 219/137.61
[58] Field of Search ............................... 219/137.7, 132, 219/136, 137.61; 226/108

[56] References Cited

U.S. PATENT DOCUMENTS

| | | | |
|---|---|---|---|
| 2,606,267 | 8/1952 | McElrath, Jr. | 219/137.7 |
| 2,719,245 | 9/1955 | Anderson | 219/137.7 |
| 3,025,387 | 3/1962 | Kinney . | |
| 3,089,022 | 5/1963 | Kinney . | |
| 3,293,477 | 12/1966 | Lobosco | 219/137.7 |
| 3,644,701 | 2/1972 | Kobayashi et al. . | |
| 3,652,819 | 3/1972 | Kerr et al. . | |
| 3,672,655 | 6/1972 | Carter | 226/108 |
| 3,679,864 | 7/1972 | Tanegashima et al. | 219/137.7 |
| 3,789,186 | 1/1974 | Rygiol . | |
| 4,107,508 | 8/1978 | Izumi et al. . | |
| 4,575,612 | 3/1986 | Prunier . | |
| 4,733,038 | 3/1988 | Girardin . | |
| 4,954,690 | 9/1990 | Kensrue | 219/137.7 |
| 4,956,541 | 9/1990 | Hiltunen . | |
| 5,278,390 | 1/1994 | Blankenship | 219/132 |
| 5,288,972 | 2/1994 | Wujek . | |
| 5,370,290 | 12/1994 | Gilliland | 226/108 |

Primary Examiner—Clifford C. Shaw
Attorney, Agent, or Firm—Zarley, McKee, Thomte, Voorhees, & Sease

[57] ABSTRACT

A welding system includes a feeder with a reel rotatably mounted therein for supplying welding wire; and a torch having a cable extending therefrom connected to the feeder for receiving wire therefrom and a pair of opposing conductive drive rolls connected to a source of charging power and mounted for powered rotation on the torch. The rolls engage, charge and deliver the wire to the work piece. Opposing rollers driven by a motor through a clutch also pull the wire from the reel in the feeder and push it through the cable. The torch is equipped with a nozzle on the torch is fitted with a nonconductive delivery tube to guidingly receive the welding wire without sparking. A unique method of delivering a charged wire electrode in a MIG welding torch assembly is disclosed. Also disclosed is a special configuration for the groove for engaging the wire electrode between the rolls or rollers.

7 Claims, 5 Drawing Sheets

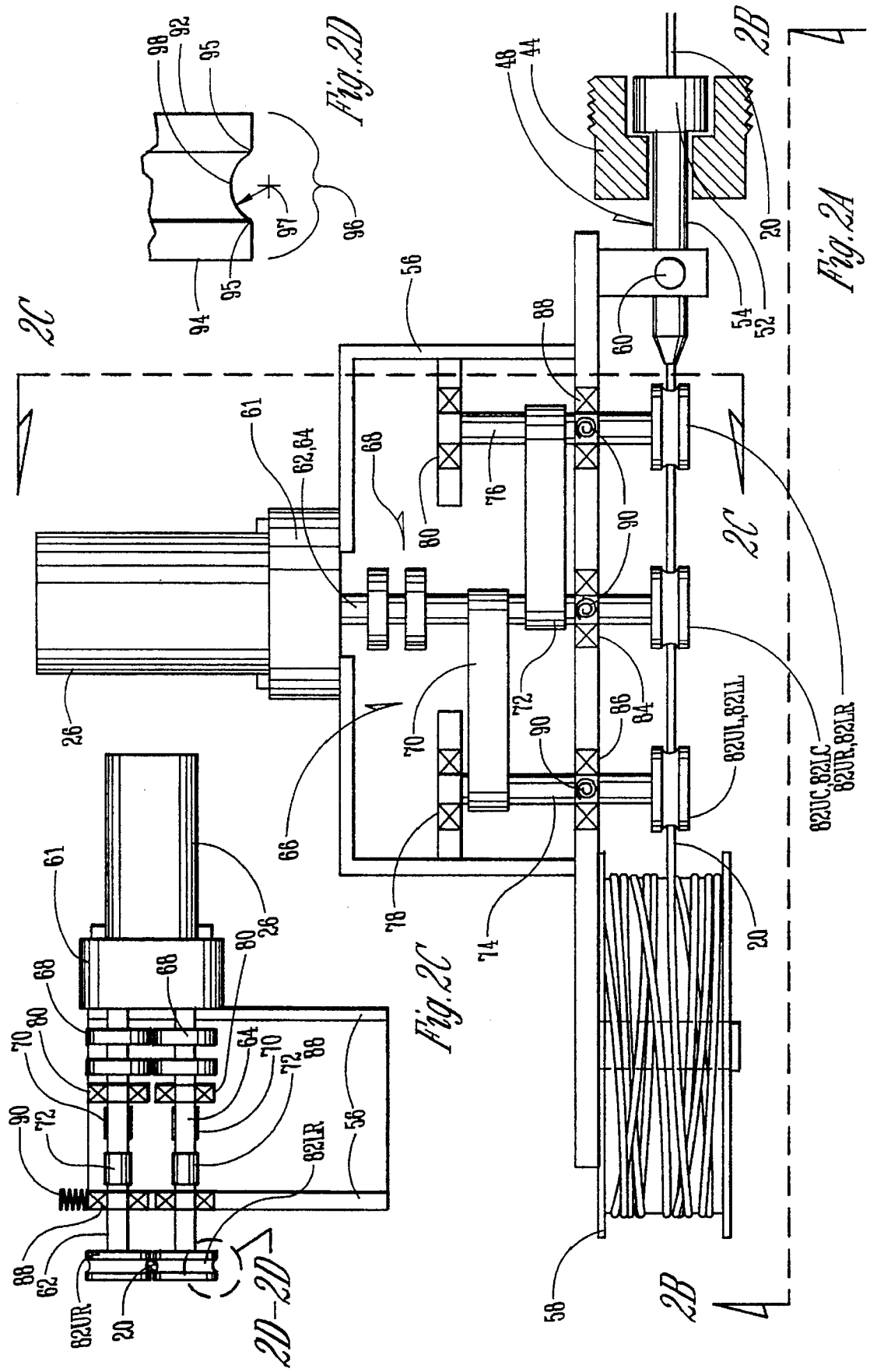

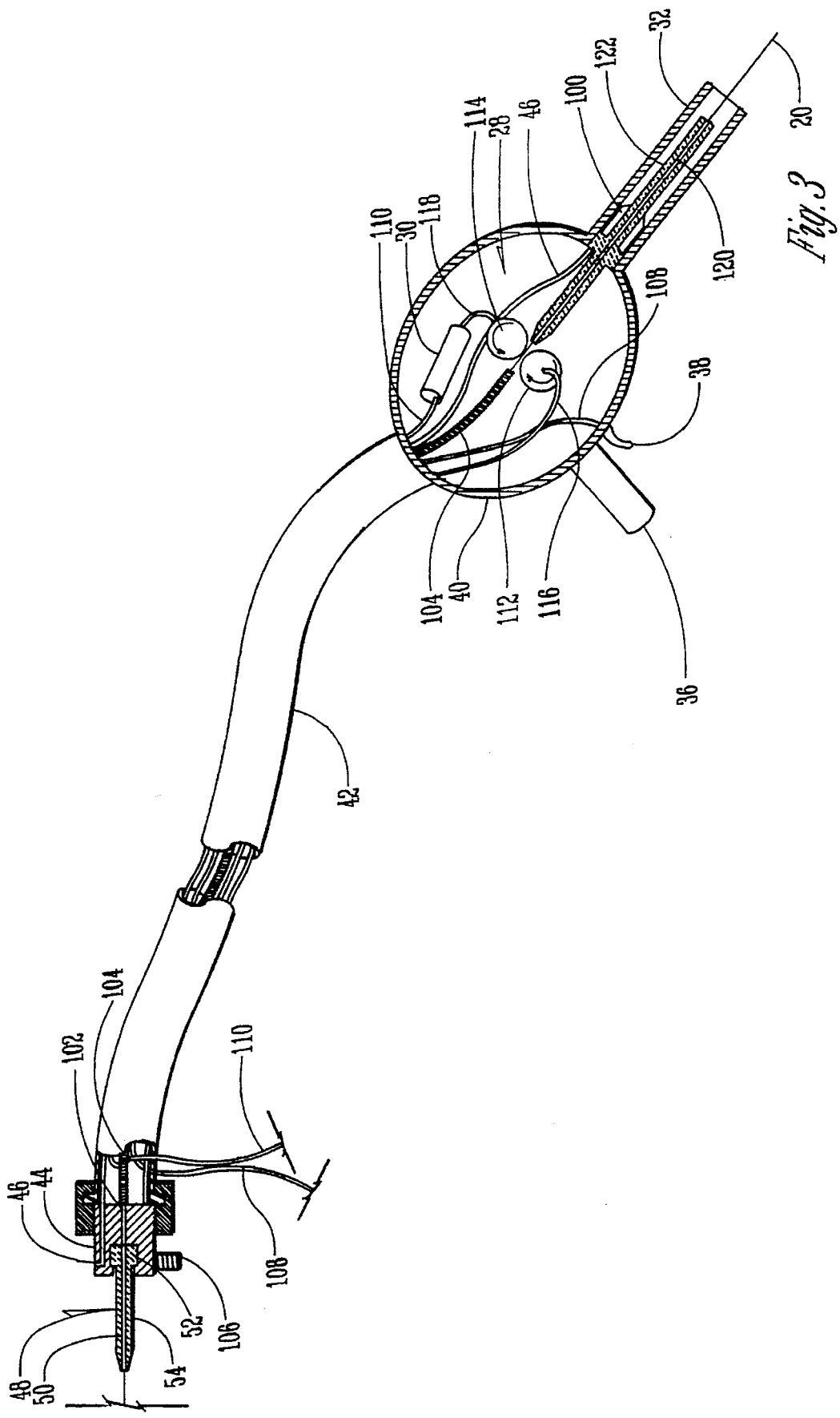

WELDING TORCH ASSEMBLY AND METHOD

BACKGROUND OF THE INVENTION

The present invention relates to the field of welding devices. More particularly, this invention relates to welding devices through which metal welding wire is fed and methods of charging and delivering welding wire to an oppositely charged work piece through such devices.

In general, metal-arc inert gas (MIG) welding is a type of shielded-arc welding that is well known and widely used. Shielded-arc welding is based on the principle of protecting the molten filler metal by covering it with chemically inert gas. A power supply charges the work piece to be welded with an electrical potential or charge of one polarity while a metal wire electrode is dispensed through a torch and charged with an electrical potential of an opposite polarity. Meanwhile, an inert gas is delivered through the torch to the free end of the electrode to cover the electrical welding arc which occurs when the charged electrode is brought close to the oppositely charged work piece. When the arc is initiated, the electrical potential or voltage provides a welding current that melts the wire electrode and results in molten filler metal being deposited on the work piece to form a weld. Various types of electrodes have been used in MIG welding, including steel and aluminum wire.

Many MIG welding systems are manually operated with a trigger on the torch, but recently automated systems have been developed. However, problems associated with delivering the wire electrode through the welding torch have generally hampered the success of automated MIG welding systems, particularly when the wire electrode is aluminum. A conventional MIG welding system has a wire delivery system with a wire drive assembly that pulls the wire from an external reel. The wire drive assembly includes an opposing wheel device having either one set of two rolls or two sets of two rolls grippingly engaging the wire electrode therebetween. The rolls are typically made of steel. Each set of rolls grips the wire with adjustable pressure as the result of compression spring which urge the rolls together. The outer circumference of each roll has a V-shaped annular groove for grinding and gripping the wire. The size of the groove matches the diameter of the wire being pulled. The rolls are geared together and driven by a variable speed motor whose speed is regulated by a wire drive control.

An adapter and a three to fifteen foot torch cable are connected to the wire drive assembly and receive the wire as it is pushed from the rolls. The adapter is typically made of copper or brass. Welding power is input through a lug on the adapter and is routed through the cable. The torch cable also houses various wires, hoses and passageways for "utilities", such as cover gas, power and control, and optional cooling water.

The cable is connected to a welding pull torch that delivers the wire electrode and cover gas to the point of welding at the work piece. A motor drives a set of drive rolls mounted in the housing of the torch to assist the wire drive assembly by pulling the wire through the cable and the torch. Finally, the wire electrode is pushed through a precision bore in a contact tip mounted in the nozzle of the torch. The weld power is transferred to the wire electrode by the contact tip, which is a consumable in the welding process. Copper or copper alloy materials are typically used to provide a contact tip that is an excellent conductor.

The positive terminal of an electrical power supply is connected to the lug on the adapter. Electrical power is also provided for the variable speed motor of the wire drive assembly. Power extends to the motor in the pull torch via the cable. Furthermore, the contact tip is connected to the power supply by a wire through the cable so that the contact tip can transfer welding power to the wire electrode as it exits the torch. The oppositely charged terminal of the power supply is connected to the work piece.

Some properties of aluminum, such as low melting temperatures, low electrical resistance and high thermal emissivity, are advantageous for MIG welding. However, certain other properties of aluminum, such as high malleability, low columnar strength and tendency to naturally produce an abrasive oxide coating (aluminum oxide), lead to difficulties in utilizing aluminum wire electrodes in existing MIG welding devices and processes. Many of these difficulties are less pronounced or almost insignificant if steel electrodes are used. For instance, the aluminum wire electrode abrades the conduit in the cable, the contact tip, and the rolls, whereas a steel wire electrode essentially does not. Steel is more resistant to the deformation and shaving that can result when the wire electrode is engaged by the rolls. Gripping an aluminum wire electrode without deforming it is difficult. Although "bird nesting" or jams of the wire electrode are possible with steel, they are much more likely with aluminum because of its low columnar strength and easily deformable cross section.

There is a need for an improved MIG welding device and process, particularly one better suited for using an aluminum wire electrode. Therefore, an object of the present invention is the provision of a metal-arc inert gas (MIG) welding torch assembly and method that constitute significant improvements over existing weld torch assemblies and methods.

Another object of this invention is the provision of a MIG welding torch assembly that minimizes the mechanical inertia that the wire electrode must overcome to initiate a welding arc.

Another object of this invention is the provision of a MIG welding torch assembly having low electrical inertia to overcome at arc starting.

Another object of this invention is the provision of a MIG welding torch assembly and method that minimizes the contact of the wire electrode with other metal surfaces.

Another object of this invention is the provision of a MIG welding torch assembly having reduced risk of internal electrical sparking.

Another object of this invention is the provision of a MIG welding torch assembly that is well adapted for using a variety of types of metal wire electrodes, including but not limited to steel and aluminum.

Another object of this invention is the provision of a MIG welding torch assembly that is particularly well adapted for using aluminum wire electrodes.

Another object of this invention is the provision of a MIG welding torch assembly capable of being manipulated either manually or automatically.

Another object of this invention is the provision of a MIG welding torch assembly having a unique method and structure for wire acceleration.

Another object of this invention is the provision of a MIG welding torch assembly that is adapted for use with a power supply that generates a constant current.

Another object of this invention is the provision of a MIG welding torch assembly that reliably delivers high quality welds.

Another object of this invention is the provision of a MIG welding torch assembly that is durable in use and economical to manufacture.

This invention contemplates other objects, features and advantages which will become more fully apparent from the following detailed description taken in conjunction with the accompanying drawings.

BRIEF DESCRIPTION OF THE DRAWINGS

FIG. 2A is a top view of the feeder assembly of FIG. 1.

FIG. 2C is a right side elevation view of the feeder assembly of FIG. 1.

FIG. 2D is an enlarged view of the area 2D—2D in FIG. 2C, which shows the circumferential profile of the drive roll of this invention.

FIG. 3 is a partially cutaway view of the integral cable/pull torch assembly of FIG. 1.

SUMMARY OF THE INVENTION

Figure 1:
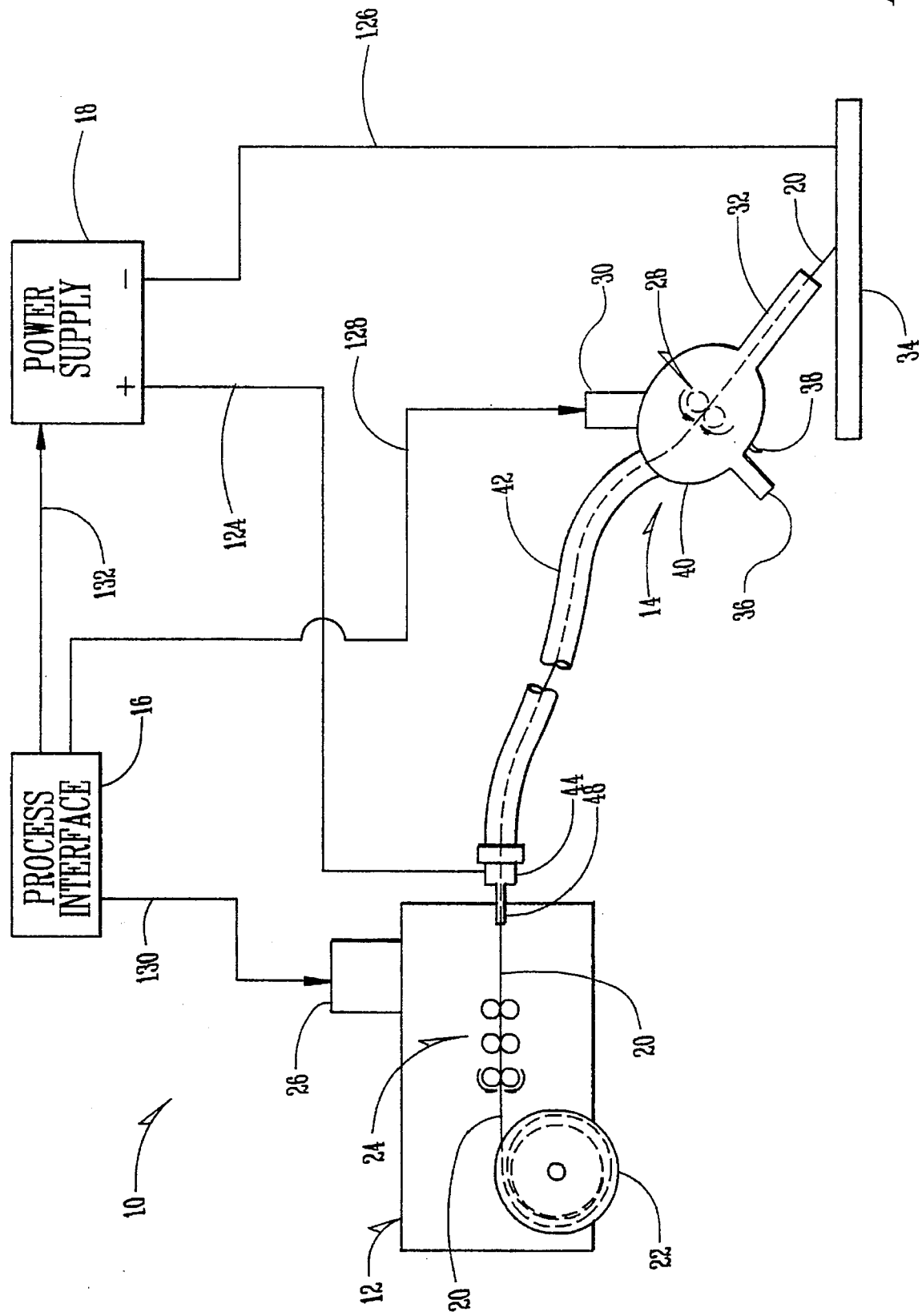
FIG. 1 is a simplified schematic diagram depicting the present invention.

The welding torch apparatus of the present invention includes a feeder mechanism having a housing with a reel rotatably mounted therein for supplying welding wire, and a torch having an elongated cable extending therefrom connected to the feeder assembly for receiving the welding wire. A pair of opposing conductive drive rolls is connected to the electrical power supply and mounted for rotation on the torch. The drive rolls are driven by a motor, preferably a variable speed DC motor. This motor is selectively engaged or disengaged via the process interface to initiate or stop wire feeding. The drive rolls engage, charge, and deliver the welding wire to the work piece through a nozzle that extends from the torch. The nozzle has a non-conductive delivery tube mounted therein having an inside diameter adapted to receive and guide the welding wire. Thus, charge is not applied to the wire electrode until it is almost ready to exit the torch and be delivered to the work piece. The charging of the wire electrode at the drive rolls in the torch tends to be safer, more efficient, and less troublesome than the prior art method of charging the wire electrode at a consumable conductive contact tip in the nozzle.

The feeder mechanism of the present invention includes a plurality of opposing drive rolls or rollers, which in pairs engage and pull the welding wire from the reel. These rollers are driven by a constantly running AC motor through a continuously-slipping clutch which delivers a constant turning torque to the rollers. The rollers in turn deliver a continuous force to the welding wire which they engage. The feeder mechanism continuously responds to the wire speed demanded by the welding torch via the engagement of the rollers to the wire. The engagement pressure of the rollers and the slipping torque of the clutch are preset such that the rollers cannot slip against the wire and the wire cannot "bird-nest", even when the wire is stalled. Also, in the stalled condition, a continuous force is delivered to the wire which "preloads" the wire into the cable so that less mechanical inertia will have to be overcome when wire is demanded by the torch.

A process interface provides coordinated operation of the welding system in both the manual (trigger-controlled) mode or the automated mode. In the automated mode, the process interface allows external signals from automated equipment such as robot, to control the various parameters of the welding process, such as wire speed and the electrical current passing through the wire electrode.

This invention also encompasses a method of delivering charged wire electrode to a work piece in a MIG welding torch assembly. The method includes mounting a wire electrode wound on a reel in a powered feeder mechanism, pulling the welding wire from the reel, pushing the wire electrode through a cable mounted on the torch, pulling the wire electrode through the cable and into the torch by engaging it with a pair of rotating opposing conductive rolls, and imparting electrical potential from an electrical power supply to the welding wire by contact with the opposing charged conductive rolls, and pushing the wire electrode through a nonconductive delivery tube mounted in the nozzle of the torch. This method avoids the problems associated with transferring electrical potential to the wire electrode through a conductive contact tip, but maintains all the benefits of charging the wire electrode as closely to the work piece as possible.

The welding torch and method of this invention is particularly advantageous when aluminum wire electrode is utilized.

DETAILED DESCRIPTION OF THE PREFERRED EMBODIMENT

The welding torch assembly 10 of the present invention is shown in simplified form in FIG. 1. The weld torch assembly 10 includes three major components: a feeder assembly 12, an integrated cable/pull torch assembly 14 (hereinafter—torch assembly 14), and a process interface 16. One terminal of a power supply 18 is operably connected to a wire electrode 20 dispensed from a reel 22, which is preferably mounted in the feeder assembly 12. Pulling means 24 are mounted for rotation in the feeder assembly 12 and driven by an alternating current (AC) motor 26 for engaging the wire electrode 20 and pulling it from the reel 22. A pulling/charging means 28 powered by a DC motor 30 and having opposing metallic rollers pulls the wire electrode 20 through the torch assembly 14 and pushes it out the nozzle 32 toward a work piece 34. The work piece 34 is electrically connected to the other terminal of the power supply 18 such that an electrical arc can be established when the charged wire electrode 20 is brought into proximity with the oppositely charged work piece 34.

The torch assembly 14 includes a handle 36 mounted on a housing 40 for manual or automatic manipulation. The handle 36 and a trigger 38 for initiating movement of the wire electrode 20 and establishing an arc are mounted on the housing 40.

The torch assembly 14 has a flexible torch cable 42 that is preferably integrally attached to the housing 40 (see FIG. 3). The torch cable 42 provides the weld torch assembly 10 with the flexibility required to reach various locations to be welded on the work piece 34. Furthermore, the torch cable 42 has a durable outer sheath that protects the wire electrode 20, as well as the other utilities contained in the cable such as electrical wires, the cover gas hose, and optional water hoses for cooling, if necessary.

As shown in FIGS. 1 and 3, the end of the torch cable 42 that is remote from the torch housing 40 is in sealed connection with a torch adapter 44. The torch adapter 44 includes a passage 46 for feeding cover gas. The passage 46 extends through the cover gas hose of the cable 42 and into the torch assembly 14. The torch adapter 44 also partially houses an elongated interchangeable insert 48 that interconnects the adapter 44 and the feeder assembly 12. The insert 48 is interchangeable, having a centrally located, longitudinal bore 50 that is specifically sized for receiving a wire electrode 20 of a particular diameter. For instance, a 0.064 inch diameter bore has been found to acceptably guide a 0.045 inch diameter wire electrode 20. Of course, inserts with other bore diameters may be used for other sizes of wire electrodes.

Figure 2B:
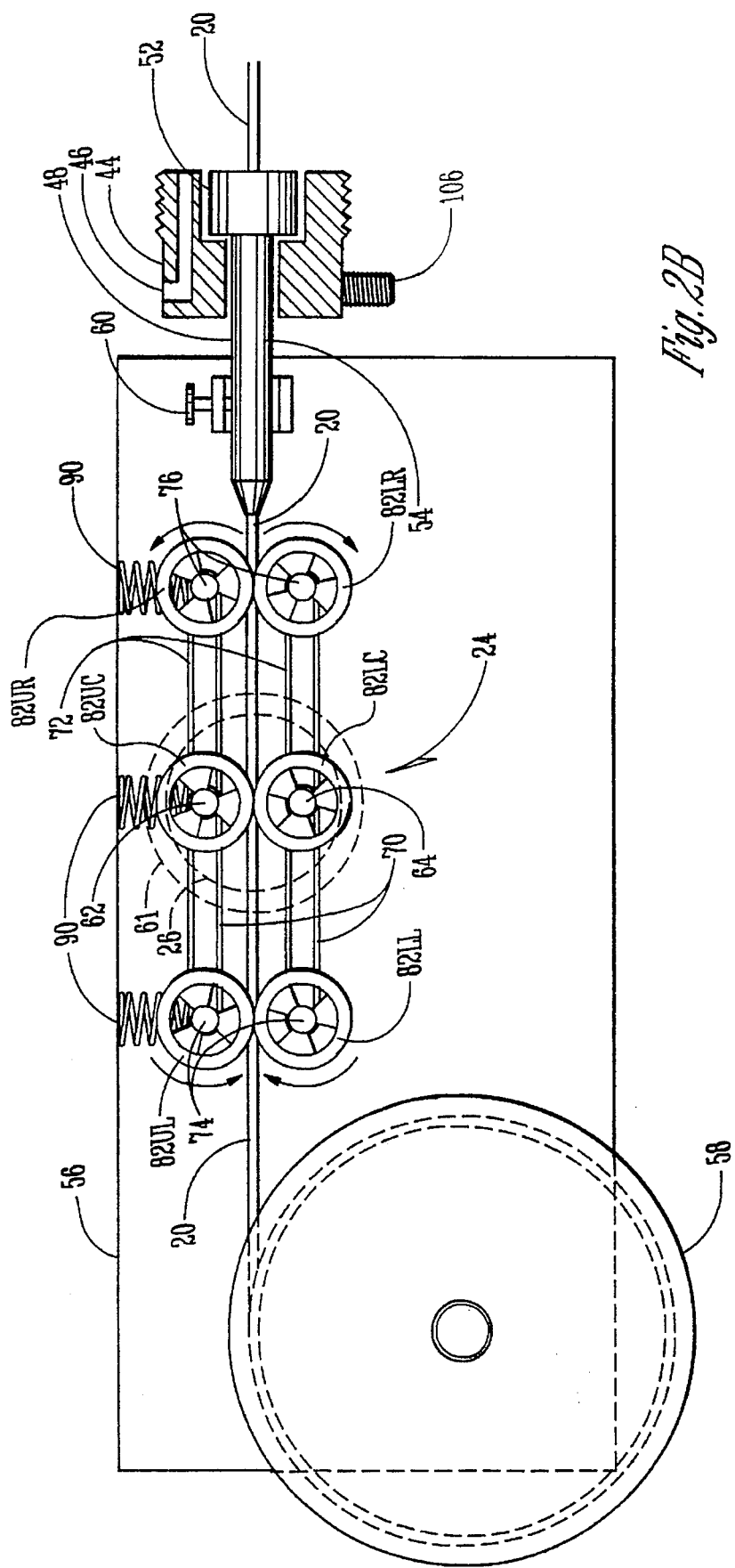
FIG. 2B is a front view of the feeder assembly of FIG. 1.

The insert 48 preferably comprises an enlarged diameter cylindrical portion 52 and a reduced diameter cylindrical portion 54. The enlarged diameter cylindrical portion 52 is restrained in the end of the adapter 44. The reduced diameter cylindrical portion 54 extends into the feeder assembly 12, as best seen in FIGS. 2A and 2B. Preferably, the insert 48 is constructed of a ceramic material, which provides good wear resistance under abrasion, low friction and is not conductive.

The feeder assembly 12 is one of the novel aspects of this invention. The feeder assembly 12 includes a frame 56, a reel 58 rotatably mounted thereon for storing and dispensing the wire electrode 20, and a pressure screw 60 mounted on the frame 56. The pressure screw 60 extends around the reduced diameter cylindrical portion 54 of the insert 48 and clamps it so that bore 50 is in position for receiving the wire electrode 20 as it is pulled from the reel 22 by the pulling means 24.

The AC motor 26 provides rotary power to the pulling means 24 via a gearbox 61 having dual output shafts 62 and 64 and a transmission means 66 (see FIGS. 2A, 2B and 2C). Preferably, the upper output shaft 62 is vertically aligned with the lower output shaft 64. Thus, the upper part of the transmission means 66 includes a clutch 68 that is mounted to the output shaft 62 adjacent the gearbox 61. As best seen in FIG. 2A, shaft 62 provides rotary power via belts 70 and 72 to stub shafts 74 and 76, respectively. Stub shafts 74 and 76 are mounted on frame 56 and their inboard ends are supported for rotation by bearings 78 and 80, respectively. Stub shafts 74 and 76 preferably lie in the same horizontal plane as the output shaft 62 (see FIG. 2B), but are laterally spaced apart from each other for reasons that will be apparent. The outboard ends of the stub shafts 74 and 76 are drivingly connected to drive rolls 82, more specifically 82UL and 84UR. A bearing 86, which is mounted between the drive roll 82UL and the drive belt 70, supports the outboard portion of the stub shaft 74. Similarly, a bearing 88 supports the outboard portion of the stub shaft 76 between the drive roll 84UR and the drive belt 72. The upper output shaft 62 also has a drive roll 82UC drivingly attached to its outboard end and a bearing 84 supports the shaft 62 between the drive roll 82UC and the drive belt 72. A lower set of drive wheel 82LL, 82LC, 82LR are driven by the lower output shaft 64 in the same manner. The wire electrode 20 is engaged between the upper and lower sets of rolls.

Downward pressure is applied by springs 90 to the upper drive rolls 82UL, 82UC, and 82UR at the bearings 84, 86 and 88. As shown in FIG. 2B, springs 90 have one end mounted to the frame 56 and the other end engages the bearing 84, 86 or 88 for the respective drive roll 82UL, 82UC or 82UR. As a result, springs 90 control the pressure with which the drive rolls 82UL, 82UC, 82UR, 82LL, 82LC and 82LR tightly yet yieldingly engage the wire electrode 20. Therefore, each set of opposing rolls grips the wire electrode 20 with pressure that is adjustable based on the spring tension.

The periphery of each drive roll 82 has a groove to guide the wire electrode 20 and allow the rolls 82 to grip the wire more effectively. The groove size is matched to the diameter of the wire electrode 20. In the preferred embodiment, which is well adapted to aluminum wire electrode, each drive roll 82 is thermally hardened and thereafter ground so as have a unique U-shaped groove configuration. Each drive roll 82 has opposite planar surfaces 92 and 94, and a circumferential surface 96 extending therebetween. Circumferential surface 96 has a centralized annular depression 98 ground therein between surfaces 92 and 94. Preferably, the depression 98 extends to a maximum depth of approximately 0.016 of an inch and has a radius 97 of approximately 0.050 of an inch. The sides of the depression 98 are blended with the rest of the circumferential surface 96 by a radius 95 of approximately 0.020 of an inch. Therefore, a smooth and shallow depression 98 is provided for the rollers 82 to grippingly engage the wire electrode 20 between them without significantly deforming or shaving it. The drive rolls 82 preferably have an outside diameter greater than three inches.

The feeder assembly 12 of the present invention provides lower mechanical inertia by mounting the reel 22 to the frame 26, thus integrating the reel 22 into the feeder assembly 12. The usual inlet conduits for bringing the wire electrode 20 into the feeder assembly are not required. Furthermore, reel 22 preferably has a large diameter, at least 12 inches, and low inertia to minimize the gripping pressure that needs to be applied to the wire by any single set of vertically aligned drive rolls 82. The use of belts 70 and 72 for driving the stub shafts 74 and 76 further helps to minimize the mechanical inertia of the system.

The use of the clutch 68 between the drive motor 26 and the drive rolls 82 presents several functional advantages. First, the clutch limits the torque applied to the wire electrode 20 so as to prevent the drive rolls 82 from spinning or skidding on the wire electrode 20. Second, the clutch limits the torque applied to the wire electrode 20, thus helping prevent the phenomena known as "bird-nesting". Bird nesting results from pushing the wire too hard and buckling it in the bore 50 of the insert 48 or in the torch assembly 14. Third, the clutch allows the motor 26 to run constantly, even while the drive rolls 82 are "stalled" against the wire electrode 20. The inertia of the motor 26 does not need to be overcome to initiate welding since the motor is already running whenever the main power is on (see FIG. 4). The mechanical inertia of the system is also effectively lowered by preloading the wire into the torch assembly 14 when the system is not active. The inertia of the drive rolls 82 pushes or preloads the wire electrode 20 into the torch assembly 14 after the clutches 68 have disconnected the motor 26 from the drive rolls 82. This results in less inertia having to be overcome to restart the loading of the wire electrode 20 when the wire drive motor 26 is reconnected to drive the rolls 82.

Additional structural features and the operation of the weld torch assembly of the present invention can be understood by following the wire electrode 20 from the reel 22 to the work piece 34. In a manual mode, the pulling of the trigger 38 engages the DC motor 30 close to the work piece 34. The drive rolls 112 and 114 pull the wire electrode 20 through the liner 104 from the bore 102 of the adapter 44 and thus from bore 50 of the insert 48. This action causes a demand on the feeder assembly 12 which responds as described above.

As seen in FIG. 3, the torch adapter 44 provides an inlet for the cover gas passage 46. Passage 46 extends completely through the torch cable 42, into the housing 40, and is in sealed connection with a diffuser 100 that is mounted in the nozzle 32. Upon reaching the diffuser 100, the cover gas is dispensed from the nozzle 32 and engulfs the end of the wire electrode 20 as it nears the work piece 34. Torch cable 42 is connected to the adapter 44 and contains a conduit 104 having a flexible liner with a bore therein coated by a "no-stick" material, such as a tetrafluoroethylene fluorocarbon polymer or fluorinated ethylene-propylene or the like, to reduce friction with the wire electrode 20. As best seen in FIG. 2, a lug connector 106 for inputting power from the power supply 18 is provided on the outside of adapter 44. Preferably, adapter 44 is constructed of a conductive material. One or more trigger wires 108 and one or more wires 110 for the powering and control of the DC motor 30 extend the torch cable 42. Furthermore, the torch cable 42 and the adapter 44 may also contain water inlet and outlet passages for cooling purposes, if needed.

As best seen in FIG. 3, the pulling/charging means 28 are mounted in the housing 40. The pulling/charging means 28 include two opposing drive rolls 112 and 114, which are constructed with the same peripheral configuration as the drive rolls 82. The drive rolls 112 and 114 are mounted for rotation within the torch housing 40 and the DC motor 30 drives them at a variable or adjustable speed. Furthermore, wires 116 and 118 supply an electrical charge from the power supply 18 to the respective drive rolls 112 and 114. Thus, when the drive rolls 112 and 114 engage the wire electrode 20 several actions take place. First, the wire electrode 20 is pulled into the torch housing 40 and towards the nozzle 42 by engagement with the rotating drive rolls 112 and 114. Second, the wire electrode 20 is pushed from the drive rolls 112 and 114 through a precision bore 120 in a delivery tube 122 that is mounted in the nozzle 32 so as to extend into the torch housing 40 adjacent the drive rolls 112 and 114. Preferably, the tube 122 is constructed of a ceramic material or other suitable material that is not conductive. The drive rolls 112 and 114 also impart an electrical charge on the wire electrode as they engage it and dispense it through the delivery tube 122 out the nozzle 32 toward the work piece 34.

The diameter of the bore 120 in the tube 122 can be selected so as to closely match the diameter of the welding wire electrode 20. This ensures the delivery tube 122 will provide adequate guidance to the wire electrode 20 and yet not impede its progress toward the work piece 34. The present invention avoids all metal to metal contact along the path of the wire electrode 20, except at points where the drive rolls engage the wire electrode 20. The charge is applied to the wire electrode shortly before it exits the torch assembly, but not by means of a long, tightly bored, consumable, conductive, contact tip that can present arcing and feeding problems.

Referring to FIG. 1, the electrical line extending from one terminal of the power supply 18 to the adapter 44 is referred to as the work lead 124. The electrical connection between the other terminal of the power supply 18 and the work piece 34 is referred to as the ground lead 126. The wires extending from the process interface 16 to the DC motor 30 are generally referred to as the torch control wires 128. The wires extending from the process interface 16 to the AC motor 26 are generally referred to as the feeder control wires 130. Finally, the wires extending between the process interface 16 and the power supply 18 are generally referred to as the power supply control wires 132.

Figure 4:
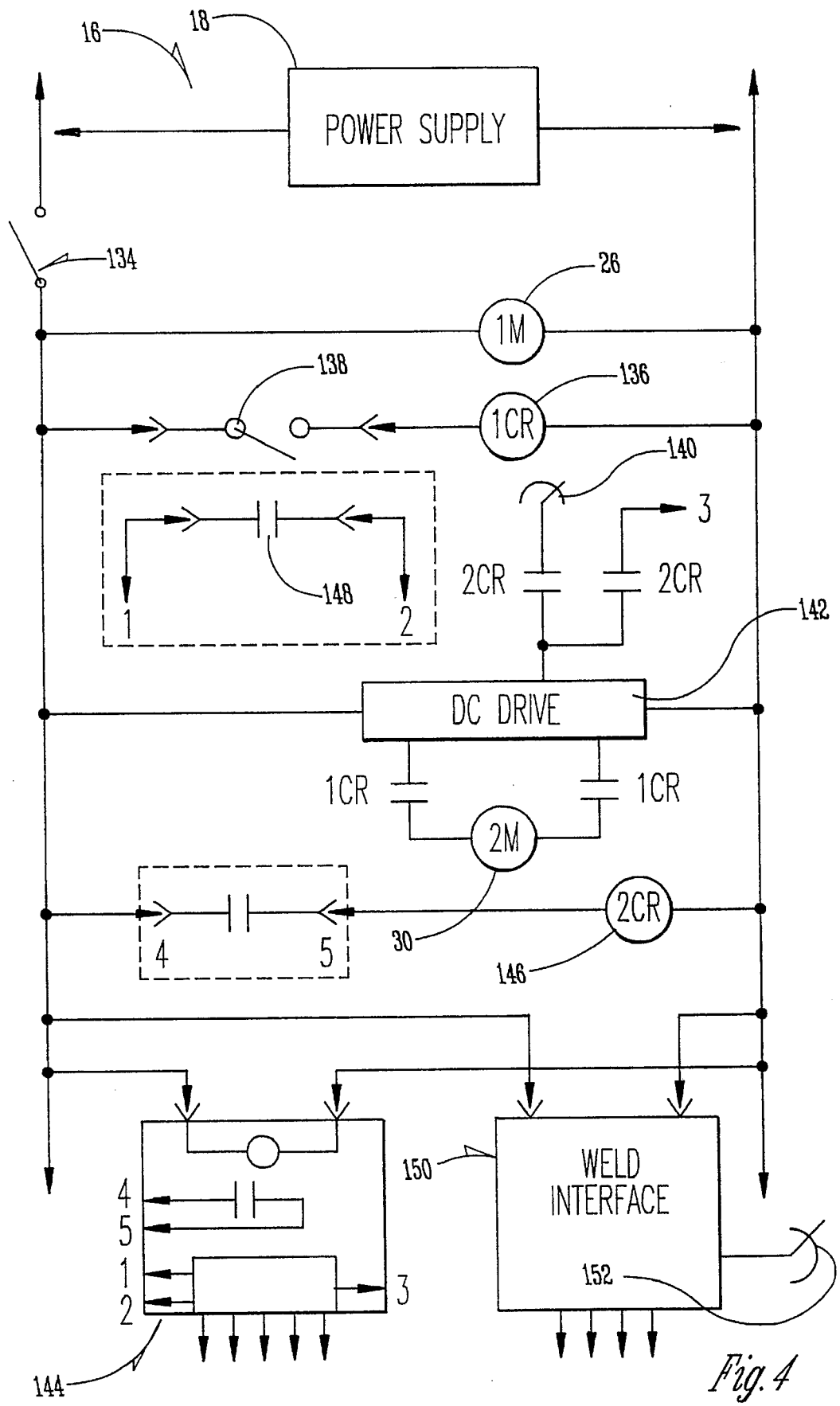
FIG. 4 is an electrical block diagram depicting the process interface of the present invention.

FIG. 4 is an electrical block diagram which discloses the structure and operation of the process interface 16. The power supply 18 is connected with the process interface 16. A switch 134 turns the power supply 18 off or on. The process interface 16 and the power supply 18 are connected with the AC motor 26, which is designated as 1M in the diagram. The AC motor 26 is supplied power and therefore turns so long as the main power switch 134 is closed. This would not be possible without the clutches 68 that are provided on the dual output shafts 62 and 64 of motor 26.

The trigger 38 initiates or terminates welding by closing or opening a switch 138 that is connected to the power supply 18 through a control relay 136, which is shown as 1CR in the diagram of FIG. 4. Electrical potential is thereby imparted to the wire electrode 20 by drive rolls 112 and 114. A potentiometer 140 is connected to the DC drive 142 of the DC motor 30 so the user can vary the speed of discharge of the wire electrode 20 in the manual (trigger controlled) mode of operation. Alternatively, the line denoted by the numeral 3 in FIG. 4 can be connected to a controller 144 in the automated when the appropriate 2CR control relay is tripped. Furthermore, a pair of 1CR control relays are connected between the DC drive 142 and the DC motor 30 to selectively engage or disengage the action of DC motor 30 based on closure of the trigger 138 or automatic contact 148.

An interface for automatic operation is also provided by the process interface 16. A control relay 146, shown as 2CR in the diagram, provides for manual operation in an open position and automated operation in a closed position. The controller 144 and a weld interface 150 are connected to the process interface 16. These devices allow the application of external signals for initiating the feeding and charging of the wire electrode and controlling the welding current and wire speed. Thus, the torch assembly 10 can be used in conjunction with automated welding equipment, for example robots.

When the control relay 146 is open, the torch assembly 10 can operate in a manual mode with the trigger 38 controlling the initiation and termination of welding. However, with control relay 146 closed, the torch assembly 10 can be operated in an automated mode. In the automated mode, a contact 148 within the controller 144 operatively supplants the function of the switch 138. The initiation of welding can take place via an external signal sent from automatic equipment, such as a robot. Furthermore, the controller 144 can also supplant the function of the potentiometer 140 by accepting and sending a speed signal to the DC drive 142 of the DC motor 30 via the line denoted by the numeral 3. Thus, an external speed signal can be given to the DC motor 30 in the automated mode.

A weld interface 150 is also connected with the power supply 18 and thus constantly supplies a voltage to the work piece 34 as long as the main power switch 134 is closed. A potentiometer 152 allows the voltage to be varied in the manual mode, thus also varying the current through the wire electrode 20 during welding. Other connections are provided on the weld interface 150 so that the voltage and current may be controlled by external signals from the robot in the automated mode.

The process interface 16 provides for efficient operation in either a manual mode or an automated mode according to the needs of the particular application. The torch assembly 10 of this invention is readily adaptable to switch between manually controlled operation and automated operation without long delays or significant changes in hardware. Furthermore, the torch assembly 10 is less susceptible to arcing and wire feed problems in an automated mode due to its uniquely combined mechanical structures.

It will be understood by those skilled in the art that the present invention is readily adaptable to various different types of welding wire, including but not limited to steel and aluminum wire electrodes. The smoothly blended profile of drive rolls 82, 112 and 114 make them particularly well adapted for engaging aluminum wire electrodes without significantly damaging or deforming them. Wire damage, inadvertent arcing, and wear on torch assembly components is minimized because the wire electrode 20 contacts other metal at only two points: the pulling means 24 and the pulling/charging means 28. Furthermore, charge or electrical potential is not applied to the wire electrode 20 until the pulling/charging means 28, which are located near the nozzle 32 where the wire electrode is dispensed into contact with the work piece 34.

Whereas the invention has been shown and described in connection with the preferred embodiment thereof, it will be understood that many modifications, substitutions, and additions may be made which are within the intended broad scope of the following claims. From the foregoing, it can be seen that the present invention accomplishes at least all of the stated objectives.

What is claimed is:

1. A welding torch apparatus for delivering welding wire to a weld on a work piece, comprising:

a feeder mechanism having a housing with a reel rotatably mounted therein for supplying welding wire;

a torch having an elongated cable extending therefrom connected to the feeder mechanism for receiving welding wire therefrom and a pair of opposing conductive drive rolls connected to a source of electrical charging power and mounted for rotation on the torch and driven by a torch motor for engaging, charging, and delivering the welding wire to a work piece;

said feeder mechanism further including a pair of opposing rollers for engaging and pulling the welding wire from the reel, said rollers being continuously driven by a feeder motor connected to a clutch;

said feeder motor having vertically aligned and spaced dual output shafts, each of the dual output shafts being connected to a clutch, each of the dual output shafts also being interposed between a pair of horizontally spaced stub shafts and drivingly connected thereto with belt means, the stub shafts and the output shafts each having a roller drivingly connected thereto, whereby three pairs of opposing rollers are provided for engaging and pulling the welding wire.

2. The apparatus of claim 1 comprising a nonconductive insert interposed between the feeder mechanism and the cable, the insert having an inside diameter adapted to receive and guide the welding wire.

3. The apparatus of claim 1 wherein the three pairs of opposing rollers are horizontally aligned with each other and the rollers of each pair of opposing rollers are vertically aligned.

4. The apparatus of claim 1 wherein the rollers are at least three inches in diameter.

5. The apparatus of claim 1 wherein the rollers have opposite planar faces and a circumferential periphery therebetween with a annular depression centrally located with respect to the planar faces, the depression forming a radius of approximately 0.050 inches and extending to a maximum depth of 0.016 inches.

6. The apparatus of claim 5 wherein the depression is formed between an inboard cylindrical surface and an outboard cylindrical surface on the circumferential periphery, and a radius of 0.020 inches minimum defines the intersections between the depression and the respective adjacent cylindrical surfaces.

7. A welding torch apparatus for delivering welding wire to a weld on a work piece, comprising:

a feeder mechanism having a housing with a reel rotatably mounted therein for supplying welding wire;

said feeder mechanism further including a pair of opposing rollers for engaging and pulling the welding wire from the reel, said rollers being continuously driven by a feeder motor connected to a clutch;

said feeder motor having vertically aligned and spaced dual output shafts, each of the dual output shafts being connected to a clutch, each of the dual output shafts also being interposed between a pair of horizontally spaced stub shafts and drivingly connected thereto with belt means, the stub shafts and the output shafts each having a roller drivingly connected thereto, whereby a plurality of pairs of opposing rollers are provided for engaging and pulling the welding wire.

* * * * *